United States Patent
Zhong

(10) Patent No.: US 11,837,016 B2
(45) Date of Patent: Dec. 5, 2023

(54) INTELLIGENT ANALYSIS SYSTEM, METHOD AND DEVICE

(71) Applicant: HUAWEI TECHNOLOGIES CO., LTD., Guangdong (CN)

(72) Inventor: Yongcai Zhong, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 210 days.

(21) Appl. No.: 17/120,409

(22) Filed: Dec. 14, 2020

(65) Prior Publication Data

US 2021/0097259 A1    Apr. 1, 2021

Related U.S. Application Data

(63) Continuation of application No. PCT/CN2019/094113, filed on Jul. 1, 2019.

(30) Foreign Application Priority Data

Jul. 27, 2018  (CN) .......................... 201810847537.X

(51) Int. Cl.
*G06V 20/52*        (2022.01)
*G06V 40/16*        (2022.01)
*H04N 5/765*        (2006.01)

(52) U.S. Cl.
CPC ............ *G06V 40/161* (2022.01); *G06V 20/52* (2022.01); *G06V 40/172* (2022.01); *H04N 5/765* (2013.01)

(58) Field of Classification Search
CPC .... G06V 40/161; G06V 20/52; G06V 40/172; H04N 5/765
See application file for complete search history.

(56) References Cited

U.S. PATENT DOCUMENTS

| | | | |
|---|---|---|---|
| 2004/0260947 A1 | 12/2004 | Brady et al. | |
| 2009/0015671 A1* | 1/2009 | Addy | H04N 21/44209 348/143 |
| 2011/0128382 A1* | 6/2011 | Pennington | G07F 17/3241 348/E7.085 |
| 2012/0195363 A1* | 8/2012 | Laganiere | H04N 19/85 375/E7.026 |

(Continued)

FOREIGN PATENT DOCUMENTS

| | | |
|---|---|---|
| CN | 101196979 A | 6/2008 |
| CN | 201247530 Y | 5/2009 |

(Continued)

OTHER PUBLICATIONS

Shi, Weijia, Wang, Lin and Jia, Liding, Software and hardware implementation of smart hands-free set-top box, Shanghai Research Institute of China Telecom Co., Ltd., Shanghai, China, 7 pages.

*Primary Examiner* — Syed Haider
(74) *Attorney, Agent, or Firm* — HUAWEI TECHNOLOGIES CO., LTD.

(57) ABSTRACT

A system includes at least one media data collection device and a front-end intelligent analysis device. The at least one media data collection device and the front-end intelligent analysis device are located at a front end of a monitoring system, and can meet a relatively high real-time requirement. The at least one media data collection device may collect media data, and send the media data to the front-end intelligent analysis device.

17 Claims, 7 Drawing Sheets

(56) References Cited

U.S. PATENT DOCUMENTS

| | | | | |
|---|---|---|---|---|
| 2014/0201072 A1* | 7/2014 | Reeser | ............... | G06Q 30/04 705/40 |
| 2020/0250406 A1* | 8/2020 | Wang | ................. | H04N 23/80 |
| 2020/0402379 A1* | 12/2020 | Zhou | ............ | G08B 13/19667 |

FOREIGN PATENT DOCUMENTS

| | | | | |
|---|---|---|---|---|
| CN | 101739829 A | | 6/2010 | |
| CN | 102291574 A | | 12/2011 | |
| CN | 102457483 A | | 5/2012 | |
| CN | 203445976 U | | 2/2014 | |
| CN | 104065933 A | | 9/2014 | |
| CN | 104683768 A | | 6/2015 | |
| CN | 206060981 U | | 3/2017 | |
| CN | 110570614 A | * | 12/2019 | ....... G08B 13/19602 |
| EP | 2688296 A1 | | 1/2014 | |
| WO | 2018096371 A1 | | 5/2018 | |

\* cited by examiner

INTELLIGENT ANALYSIS SYSTEM, METHOD AND DEVICE

CROSS-REFERENCE TO RELATED APPLICATIONS

This application is a continuation of International Application No. PCT/CN2019/094113, filed on Jul. 1, 2019, which claims priority to Chinese Patent Application No. 201810847537.X, filed on Jul. 27, 2018. The disclosures of the aforementioned applications are hereby incorporated by reference in their entireties.

TECHNICAL FIELD

This application relates to the field of media data processing, and in particular, to an intelligent analysis system, method and device.

BACKGROUND

Media data collection devices emerge as science and technology are developing. A media data collection device may be used to collect media data. For example, the media data collection device may be used to collect media data such as a video, a picture, and audio. It may be understood that in many application scenarios, media data collected by the media data collection device needs to be analyzed and processed. However, on one hand, many media data collection devices do not have a function of analyzing and processing the media data. For example, many media data collection devices may only be configured to collect the media data, and cannot analyze and process the media data. On the other hand, many media data collection devices do not have a function of performing specific analysis and processing on the media data. For example, many media data collection devices have a noise reduction function, but do not have a facial recognition function. When facial recognition needs to be performed on the media data, the media data collection device cannot analyze and process collected media data, and cannot implement the facial recognition on the media data.

Therefore, it is necessary to provide a solution that can analyze and process the media data collected by the media data collection device when the media data collection device does not have the function of analyzing and processing the media data collected by the media data collection device.

SUMMARY

Embodiments of this application provide an intelligent analysis system, method, and device, to analyze and process media data collected by a media data collection device when the media data collection device does not have a function of analyzing and processing the media data collected by the media data collection device.

According to a first aspect of the embodiments of this application, an intelligent analysis system is provided, including at least one media data collection device and a front-end intelligent analysis device. The at least one media data collection device and the front-end intelligent analysis device may establish a connection by wire or wirelessly. The at least one media data collection device may collect media data, and send the media data to the front-end intelligent analysis device. Because the front-end intelligent analysis device has a function of analyzing and processing the media data, after receiving the media data, the front-end intelligent analysis device may analyze and process the media data. It can be learned that, even if the media data collection device does not have the function of analyzing and processing the media data, the media data collection device may send the media data to the front-end intelligent analysis device, and the front-end intelligent analysis device analyzes and processes the media data to obtain an analysis result. The media data collection device and the front-end intelligent analysis device may be directly connected by wire or wirelessly, or indirectly connected through a forwarding device. The media data collection device and the front-end intelligent analysis device are located at a front end of the monitoring system. Because the media data collection device and the front-end intelligent analysis device are located at the front end, time for exchanging the media data between the media data collection device and the front-end intelligent analysis device is relatively short, and the media data can be processed timely, to meet a relatively high real-time requirement.

The monitoring system is divided into the front end and a back end. The front end and the back end are usually bounded by an access gateway on a media data collection device side. The media data collection device side is the front end of the monitoring system, and is configured to collect the media data, including devices such as the at least one media data collection device, an encoder, and an alarm. The media data collected by the front end is transmitted to the back end of the monitoring system through the access gateway. The back end of the monitoring system is used to store, process, and analyze the media data collected by the front end, and may also be used to display the media data and manage a front-end device. The media data collection device and the front-end analysis device in the embodiments of this application are located at the front end of the monitoring system.

In a possible implementation of this embodiment of this application, the front-end intelligent analysis device may be any device that has the function, of analyzing and processing the media data, not provided by the at least one media data collection device. In an example, the front-end intelligent analysis device may be a media data collection device that has the function of analyzing and processing the media data.

In a possible implementation of this embodiment of this application, the at least one media data collection device may be a common camera or a camera with a single front-end intelligent analysis function. The camera with the single front-end intelligent analysis function may include, for example, a camera with a noise reduction function. Correspondingly, the front-end intelligent analysis device may be a smart camera with a plurality of front-end intelligent analysis functions, and is configured to analyze and process media data collected by the common camera or a single smart camera.

In a possible implementation of this embodiment of this application, it is considered that in actual application, the analysis result may need to be further processed. For example, the analysis result is displayed on a display screen. For another example, the at least one media data collection device is controlled, based on the analysis result, to execute a corresponding task. The front-end intelligent analysis device may further send the analysis result to a media data server, so that the media data server further processes the analysis result, for example, displays the analysis result on the display screen, or forwards the analysis result to another server.

In a possible implementation of this embodiment of this application, it is considered that in actual application, the at least one media data collection device may need to be controlled, based on the analysis result, to execute a corresponding task. Therefore, the front-end intelligent analysis device may further generate a corresponding task execution instruction based on the analysis result, and send the task execution instruction to the at least one media data collection device. After receiving the task execution instruction, the at least one media data collection device executes a target task based on the task execution instruction.

In a possible implementation of this embodiment of this application, it is considered that the media data server may be configured to manage media data related to the media data collected by the at least one media data collection device. In actual application, in addition to receiving the analysis result of the media data collected by the at least one media data collection device, the media data server may further need to obtain original media data collected by the at least one media data collection device, to perform further processing based on the media data collected by the at least one media data collection device and the analysis result of the media data. In view of this, in a possible implementation of this embodiment of this application, the front-end intelligent analysis device may further forward, to the media data server, the media data collected by the at least one media data collection device.

In a possible implementation of this embodiment of this application, the at least one media data collection device 110 may be indirectly connected to the front-end intelligent analysis device through the forwarding device. In other words, the processing system may further include the forwarding device. The forwarding device is not specifically limited in this embodiment of this application. In an example, the forwarding device may be, for example, a switch. Correspondingly, when the front-end intelligent analysis system includes the forwarding device, when sending the media data to the front-end intelligent analysis device, the at least one media data collection device may send the media data to the front-end intelligent analysis device through the forwarding device.

In a possible implementation of this embodiment of this application, it is considered that in actual application, when the media data needs to be analyzed and processed, and the at least one media data collection device does not have the function of analyzing and processing the media data, the front-end intelligent analysis device may be used to analyze and process the media data. However, the at least one media data collection device may not be able to determine a front-end intelligent analysis device to which the media data is sent, to analyze and process the media data. The front-end intelligent analysis device may send a media data obtaining request to the at least one media data collection device. After receiving the media data obtaining request, the at least one media data collection device sends the collected media data to the front-end intelligent analysis device, and the front-end intelligent analysis device analyzes and processes the media data.

In a possible implementation of this embodiment of this application, it is considered that in actual application, the at least one media data collection device may support a specific media data transmission protocol. For example, the at least one media data collection device supports an open network video interface forum (ONVIF) protocol. For another example, the at least one media data collection device supports a GB/T 28181 protocol. For another example, the at least one media data collection device may also support a proprietary protocol of a vendor. If the front-end intelligent analysis device sends the media data obtaining request to the at least one media data collection device through a media data transmission protocol that is not supported by the at least one media data collection device, the at least one media data collection device cannot correctly parse the media data obtaining request. Therefore, the at least one media data collection device cannot send the media data to the front-end intelligent analysis device based on the media data obtaining request. Therefore, the front-end intelligent analysis device may generate the media data obtaining request according to a media data transmission protocol corresponding to the at least one media data collection device. In this way, the at least one media data collection device sends the media data to the front-end intelligent analysis device based on the media data obtaining request.

According to a second aspect of the embodiments of this application, an intelligent analysis method is provided and applied to a front-end intelligent analysis device. The method includes: obtaining media data collected by at least one media data collection device, and analyzing and processing the media data to obtain an analysis result, where the at least one media data collection device and the front-end intelligent analysis device are located on a same local area network.

In a possible implementation of this embodiment of this application, the method further includes: sending the analysis result to a media data server.

In a possible implementation of this embodiment of this application, the method further includes: sending a corresponding task execution instruction to the at least one media data collection device based on the analysis result, where the task execution instruction is used to instruct the at least one media data collection device to execute a target task.

In a possible implementation of this embodiment of this application, the obtaining media data collected by at least one media data collection device includes: sending a media data obtaining request to the at least one media data collection device, and receiving the media data sent by the at least one media data collection device based on the media data obtaining request.

In a possible implementation of this embodiment of this application, the method further includes: generating the media data obtaining request according to a media data transmission protocol corresponding to the at least one media data collection device.

In a possible implementation of this embodiment of this application, the obtaining media data collected by at least one media data collection device includes: obtaining, through a forwarding device, the media data collected by the at least one media data collection device.

In a possible implementation of this embodiment of this application, the method further includes: forwarding the media data to the media data server.

In a possible implementation of this embodiment of this application, the front-end intelligent analysis device is a second media data collection device. The front-end intelligent analysis device may alternatively be a smart camera.

According to a third aspect of the embodiments of this application, an intelligent analysis device is provided, including an obtaining unit and an analysis unit. The obtaining unit is configured to obtain media data collected by at least one media data collection device, and the analysis unit is configured to analyze the media data to obtain an analysis result. The intelligent analysis device is configured to be deployed at a front end of a monitoring system.

In a possible implementation of this embodiment of this application, the intelligent analysis device further includes a first sending unit, configured to send the analysis result to a media data server.

In a possible implementation of this embodiment of this application, the intelligent analysis device further includes a second sending unit, configured to send a corresponding task execution instruction to the at least one media data collection device based on the analysis result, where the task execution instruction is used to instruct the at least one media data collection device to execute a target task.

In a possible implementation of this embodiment of this application, the obtaining unit is specifically configured to send a media data obtaining request to the at least one media data collection device, and receive the media data sent by the at least one media data collection device based on the media data obtaining request.

In a possible implementation of this embodiment of this application, the intelligent analysis device further includes a request generation unit, configured to generate the media data obtaining request according to a media data transmission protocol corresponding to the at least one media data collection device.

In a possible implementation of this embodiment of this application, the obtaining unit is specifically configured to obtain, through a forwarding device, the media data collected by the at least one media data collection device.

In a possible implementation of this embodiment of this application, the intelligent analysis device further includes a forwarding unit, configured to forward the media data to the media data server.

According to a fourth aspect of the embodiments of this application, an intelligent analysis device is provided. The device includes a processor and a memory. The memory is configured to store an instruction, and the processor is configured to execute the instruction in the memory, to perform the method according to any possible implementation of the second aspect.

According to a fifth aspect of the embodiments of this application, a computer-readable storage medium is provided, including an instruction. When the instruction is run on a computer, the computer is enabled to perform the method according to any possible implementation of the second aspect.

According to a sixth aspect of the embodiments of this application, a computer program product including an instruction is provided. When the computer program product runs on a computer, the computer is enabled to perform the method according to any possible implementation of the second aspect.

DESCRIPTION OF EMBODIMENTS

Figure 1:
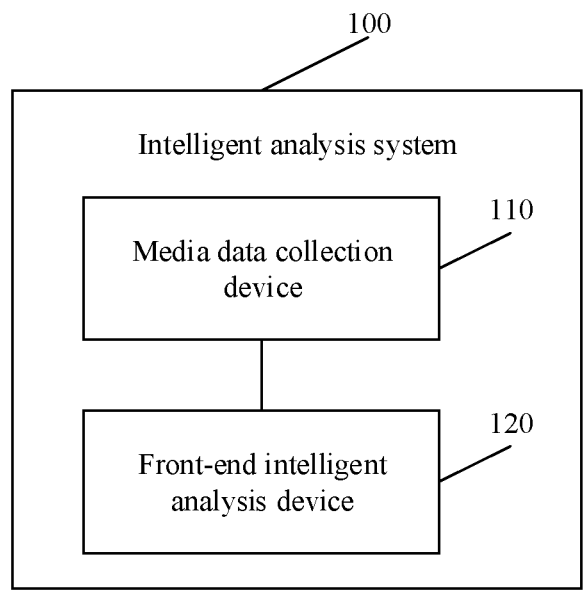
FIG. 1 is a schematic structural diagram of an intelligent analysis system according to an embodiment of this application.

Embodiments of this application provide an intelligent analysis system, method, and device, to resolve a problem that a media data collection device cannot analyze and process media data collected by the media data collection device.

In the specification, claims, and accompanying drawings of the present invention, the terms "first", "second", "third", "fourth", and so on (if existent) are intended to distinguish between similar objects but do not necessarily indicate a specific order or sequence. It should be understood that the media data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Currently, on one hand, many media data collection devices do not have a function of analyzing and processing media data. On the other hand, some media data collection devices can only perform a simple analysis and processing function and cannot expand to have a new analysis and processing function. However, in many application scenarios, media data collected by the media data collection device needs to be analyzed and processed. For example, in some scenarios, video data collected by the media data collection device needs to be analyzed and processed, to recognize a face in the video data. However, the media data collection device that collects the video data has only a noise reduction function, and does not have a facial recognition function. In this case, in actual application, the media data collection device may be replaced, and the media data collection device without the facial recognition function is replaced with a media data collection device with the facial recognition function. However, on one hand, the media data collection device with the facial recognition function may be expensive. If a large quantity of media data collection devices need to be replaced, they may be costly and difficult to install. On the other hand, actually in many scenarios, the media data collection device only needs to have the noise reduction function, and does not need to have the facial recognition function. Therefore, if the media data collection device is replaced, the media data collection device without the facial recognition function may be discarded, resulting in a resource waste.

In view of this, the embodiments of this application provide an intelligent analysis system and method, to resolve a problem that an existing media data collection device cannot analyze and process media data collected by the media data collection device without replacing the media data collection device.

FIG. 1 is a schematic structural diagram of an intelligent analysis system according to an embodiment of this application.

An intelligent analysis system 100 provided in this embodiment of this application includes at least one media data collection device 110 and a front-end intelligent analysis device 120.

It should be noted that the media data collection device 110 mentioned in this embodiment of this application may be a device having a media data collection function. The media data collection device 110 is not specifically limited in this embodiment of this application.

In an example, the media data collection device 110 may be a camera having a video data collection function. In still another example, the media data collection device 110 may be a recorder having an audio data collection function. If complex analysis processing needs to be performed on a scenario, the media data collection device may further be a device including a sensor that collects information such as a temperature, atmospheric pressure, and a location.

It should be noted that the front-end intelligent analysis device 120 mentioned in this embodiment of this application has a function of analyzing and processing media data that is not provided by the media data collection device 110. For example, the media data collection device 110 does not have a function of performing facial recognition on the media data, but the front-end intelligent analysis device 120 has a function of performing facial recognition on the media data.

The front-end intelligent analysis device 120 is not specifically limited in this embodiment of this application. The front-end intelligent analysis device 120 may be any device that has the function, of analyzing and processing the media data, not provided by the media data collection device 110. In an example, the front-end intelligent analysis device 120 may be a second media data collection device. For example, the media data collection device 110 is a common camera and does not have a facial recognition function for video data, and the front-end intelligent analysis device 120 is the second media data collection device, is a smart camera, and has the facial recognition function for video data. It should be noted that in this embodiment of this application, the media data collection device 110 and the front-end intelligent analysis device 120 may be directly connected by wired or wirelessly.

It should be noted that FIG. 1 shows only that one media data collection device 110 is connected to one front-end intelligent analysis device 120. FIG. 1 is merely an example for description, and does not constitute a limitation on this embodiment of this application. In actual application, one front-end intelligent analysis device 120 may also be connected to a plurality of media data collection devices 110.

After the media data collection device 110 establishes a connection to the front-end intelligent analysis device 120, the media data collection device 110 may send collected media data to the front-end intelligent analysis device 120. After receiving the media data, the front-end intelligent analysis device 120 may analyze and process the media data to obtain an analysis result.

It is considered that in actual application, the analysis result needs to be further processed. For example, the analysis result is displayed on a display screen. For another example, the media data collection device 110 is controlled, based on the analysis result, to execute a corresponding task.

In view of this, in a possible implementation of this embodiment of this application, the front-end intelligent analysis device 120 may further send the analysis result to a media data server, so that the media data server further processes the analysis result, for example, displays the analysis result on the display screen, or forwards the analysis result to another server.

It should be noted that the media data server mentioned in this embodiment of this application may be configured to manage media data related to the media data collected by the media data collection device 110, for example, the analysis result of the media data. The media data server is not specifically limited in this embodiment of this application. In an example, the media data server may be a server on which a media data monitoring platform is deployed.

As described above, in actual application, the media data collection device 110 may need to be controlled, based on the analysis result, to execute the corresponding task. Therefore, in another possible implementation of this embodiment of this application, the front-end intelligent analysis device 120 may further generate a corresponding task execution instruction based on the analysis result, and send the task execution instruction to the media data collection device 110. After receiving the task execution instruction, the media data collection device 110 executes a target task based on the task execution instruction. Depending on different functions that can be implemented by the media data collection device 110, the target task may be an operation such as taking an image, turning on a flash, or reporting an alarm.

It should be noted that the task execution instruction and the target task are not specifically limited in this embodiment of this application. A specific format of the task execution instruction may be determined based on an actual situation. The target task may be determined based on the media data collection device 110. For example, if the media data collection device 110 is a camera, the target task may be taking a snapshot, recording, changing a device parameter of the media data collection device 110, or the like.

It may be understood that the media data server may be configured to manage the media data related to the media data collected by the media data collection device 110. In actual application, in addition to receiving the analysis result of the media data collected by the media data collection device 110, the media data server may further need to obtain original media data collected by the media data collection device 110, to perform further processing based on the media data collected by the media data collection device 110 and the analysis result of the media data. In view of this, in a possible implementation of this embodiment of this application, the front-end intelligent analysis device 120 may further forward, to the media data server, the media data collected by the media data collection device 110.

It may be understood that the media data collection device 110 collects a large amount of media data, and not all media data needs to be analyzed and processed by the front-end intelligent analysis device 120. Some media data may be analyzed and processed by the media data collection device 110, and some other media data does not need to be analyzed and processed. For media data that does not need to be analyzed and processed by the front-end intelligent analysis device 120, in a possible implementation of this embodiment of this application, the media data collection device 110 may also send the media data to the front-end intelligent analysis device 120, and the front-end intelligent analysis device 120 forwards the media data to the media data server. Optionally, the front-end intelligent analysis device 120 may also forward, to the media data server, media data that needs to be analyzed and processed by the front-end intelligent analysis device 120.

In this embodiment of this application, the media data collection device 110 and the front-end intelligent analysis device 120 may directly or indirectly establish a connection. In a possible implementation of this embodiment of this application, the media data collection device 110 may be indirectly connected to the front-end intelligent analysis device 120 through a forwarding device. In other words, the processing system 100 may further include the forwarding device.

It should be noted that the forwarding device is not specifically limited in this embodiment of this application. In an example, the forwarding device may be, for example, a switch.

The media data collection device 110 and the front-end intelligent analysis device 120, for example, the second media data collection device, may be directly connected by wire or wirelessly, or indirectly connected through the forwarding device. The media data collection device 110 and the front-end intelligent analysis device 120 are located at a front end in a monitoring system, and are front-end devices in the monitoring system.

The monitoring system is divided into the front end and a back end. The front end and the back end are usually bounded by an access gateway on the media data collection device. The media data collection device side is the front end of the monitoring system, and is configured to collect the media data, including devices such as the at least one media data collection device, an encoder, and an alarm. The media data collected by the front end is transmitted to the back end of the monitoring system through the access gateway. The back end of the monitoring system is used to store, process, and analyze the media data collected by the front end, and may also be used to display the media data and manage a front-end device. In this embodiment of this application, the media data collection device 110 and the front-end analysis device 120 are located at the front end in the monitoring system. Therefore, time for exchanging the media data between the media data collection device 110 and the front-end intelligent analysis device 120 is relatively short, and the media data can be processed timely, to meet a relatively high real-time requirement.

Correspondingly, when the intelligent analysis system 100 includes the forwarding device, when sending the media data to the front-end intelligent analysis device 120, the media data collection device 110 may send the media data to the front-end intelligent analysis device 120 through the forwarding device.

It may be understood that, when forwarding the media data, the forwarding device needs to determine a receiver of the media data. Therefore, in a possible implementation of this embodiment of this application, when the media data collection device 110 sends the media data to the front-end intelligent analysis device 120 through the forwarding device, the media data may carry an address of the front-end intelligent analysis device 120, and the forwarding device sends the media data to the front-end intelligent analysis device 120 based on the address of the front-end intelligent analysis device 120. In another possible implementation of this embodiment of this application, an input/output interface parameter of the forwarding device may be preconfigured, so that the forwarding device forwards, to the front-end intelligent analysis device 120, the media data sent by the media data collection device 110.

As described above, in the media data collected by the media data collection device 110, some media data may not need to be analyzed and processed by the front-end intelligent analysis device 120. Therefore, when the processing system 100 includes the forwarding device, in an implementation of this embodiment of this application, the forwarding device may be further connected to the media data server. Correspondingly, the media data collection device 110 may directly send, to the media data server through the forwarding device, the media data that does not need to be analyzed and processed by the front-end intelligent analysis device 120, without forwarding the media data to the front-end intelligent analysis device 120. This simplifies a media data forwarding process of the media data that does not need to be analyzed and processed by the front-end intelligent analysis device 120. Optionally, the forwarding device may forward, to the front-end intelligent analysis device 120 and the media data server, the media data that needs to be analyzed and processed by the front-end intelligent analysis device 120.

As described above, in actual application, when the media data needs to be analyzed and processed, and the media data collection device 110 does not have the analysis and processing function, the front-end intelligent analysis device 120 may be used to analyze and process the media data. However, the media data collection device 110 may not be able to determine a front-end intelligent analysis device 120 to which the media data is sent, to analyze and process the media data. In view of this, in a possible implementation of this embodiment of this application, the front-end intelligent analysis device 120 may send a media data obtaining request to the media data collection device 110. After receiving the media data obtaining request, the media data collection device 110 sends the collected media data to the front-end intelligent analysis device 120, and the front-end intelligent analysis device 120 analyzes and processes the media data.

It should be noted that, in this embodiment of this application, a time period during which the front-end intelligent analysis device 120 sends the media data obtaining request to the media data collection device 110 is not specifically limited. In a possible implementation, an administrator may set, on a setting screen displayed by a terminal device, a time period during which the front-end intelligent analysis device 120 sends the media data obtaining request to the media data collection device 110. For example, the front-end intelligent analysis device 120 may be set on the setting screen to send the media data obtaining request to the media data collection device 110 from 20:00 to 05:00 of a next day.

It may be understood that, in actual application, the media data collection device 110 may support a specific media data transmission protocol. For example, the media data collection device 110 supports an open network video interface forum (open network video interface forum, ONVIF) protocol. For another example, the media data collection device 110 supports a GB/T 28181 protocol. For another example, the media data collection device 110 may also support a proprietary protocol of a vendor. If the front-end intelligent analysis device 120 sends the media data obtaining request to the media data collection device 110 through a media data transmission protocol that is not supported by the media data collection device 110, the media data collection device 110 cannot correctly parse the media data obtaining request. Therefore, the media data collection device 110 cannot send the media data to the front-end intelligent analysis device 120 based on the media data obtaining request.

In view of this, in a possible implementation of this embodiment of this application, the front-end intelligent analysis device 120 may generate the media data obtaining request according to a media data transmission protocol corresponding to the media data collection device 110. In this way, the media data collection device 110 sends the media data to the front-end intelligent analysis device 120 based on the media data obtaining request.

It should be noted that, in actual application, the front-end intelligent analysis device 120 may pre-obtain a media data transmission protocol supported by the media data collection device 110, and the front-end intelligent analysis device 120 generates the media data obtaining request according to the media data transmission protocol corresponding to the media data collection device 110. An implementation in which the front-end intelligent analysis device 120 pre-obtains the media data transmission protocol supported by the media data collection device 110 is not specifically limited in this embodiment of this application. In an example, the terminal device may deliver the media data transmission protocol supported by the media data collection device 110 to the front-end intelligent analysis device 120, and the front-end intelligent analysis device 120 obtains the media data transmission protocol supported by the media data collection device 110. In another example, the media data server may deliver the media data transmission protocol supported by the media data collection device 110 to the front-end intelligent analysis device 120, and the front-end intelligent analysis device 120 obtains the media data transmission protocol supported by the media data collection device 110.

It may be understood that, in actual application, the media data server may receive analysis results of media data collected by many media data collection devices. To facilitate the media data server to manage the analysis result of the media data collected by each media data collection device, the media data server needs to distinguish a media data collection device corresponding to each analysis result.

Therefore, in a possible implementation of this embodiment of this application, when sending the analysis result of the media data to the media data server, the front-end intelligent analysis device 120 may further send an identifier of the media data collection device 110 to the media data server. Specifically, when the media data collection device 110 sends the media data to the front-end intelligent analysis device 120, the media data may carry the identifier of the media data collection device 110. Therefore, when receiving the media data, the front-end intelligent analysis device 120 may obtain the identifier of the media data collection device 110. Therefore, after analyzing and processing the media data, the front-end intelligent analysis device 120 sends the analysis result of the media data and the identifier of the media data collection device 110 to the server.

It should be noted that in this embodiment of this application, the identifier of the media data collection device 110 is used to uniquely identify the media data collection device 110. The identifier of the media data collection device 110 is not specifically limited in this embodiment of this application, and the identifier of the media data collection device 110 may be specifically determined based on an actual situation.

It can be learned from the foregoing description that the front-end intelligent analysis system provided in this embodiment of this application includes the media data collection device 110 and the front-end intelligent analysis device 120. The media data collection device 110 and the front-end intelligent analysis device 120 may establish a connection by wire or wirelessly. The media data collection device 110 may collect media data, and send the media data to the front-end intelligent analysis device 120. Because the front-end intelligent analysis device 120 has a function of analyzing and processing the media data, after receiving the media data, the front-end intelligent analysis device 120 may analyze and process the media data. It can be learned that, in the front-end intelligent analysis system provided in this embodiment of this application, even if the media data collection device 110 does not have the function of analyzing and processing the media data, the media data collection device 110 may send the media data to the front-end intelligent analysis device 120, and the front-end intelligent analysis device 120 analyzes and processes the media data to obtain an analysis result.

The foregoing describes in detail the front-end intelligent analysis system provided in the embodiments of this application. The following describes the front-end intelligent analysis system provided in the embodiments of this application with reference to a specific scenario.

It should be noted that the following content is merely an example of the front-end intelligent analysis system provided in the embodiments of this application, and does not constitute a limitation on the embodiments of this application.

Figure 2:
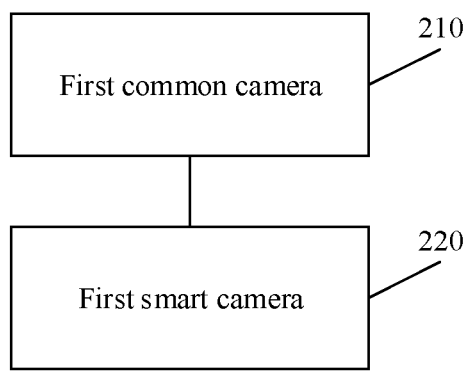
FIG. 2 is a schematic diagram of an example application scenario according to an embodiment of this application.

FIG. 2 is a schematic diagram of an example application scenario according to an embodiment of this application.

In this scenario, a media data collection device is a first common camera 210, and a front-end intelligent analysis device is a first smart camera 220. The first common camera 210 has only a video data collection function, and does not have other functions. In this scenario, facial recognition needs to be performed on a person in a part of video data collected by the first common camera 210. The first smart camera 220 has a facial recognition function.

In this scenario, one first common camera 210 and one first smart camera 220 form a front-end intelligent analysis system. The first common camera 210 is connected to the first smart camera 220 with a network cable. To be specific, the first smart camera has a reserved network port, and may be configured to directly connect to the first common camera with the network cable.

It should be noted that, in this embodiment of this application, a function of the first smart camera may be pre-obtained, and whether to establish a connection relationship between the first common camera and the first smart camera is determined based on the function of the first smart camera and an operation that needs to be performed on the video data collected by the first common camera.

Figure 3:
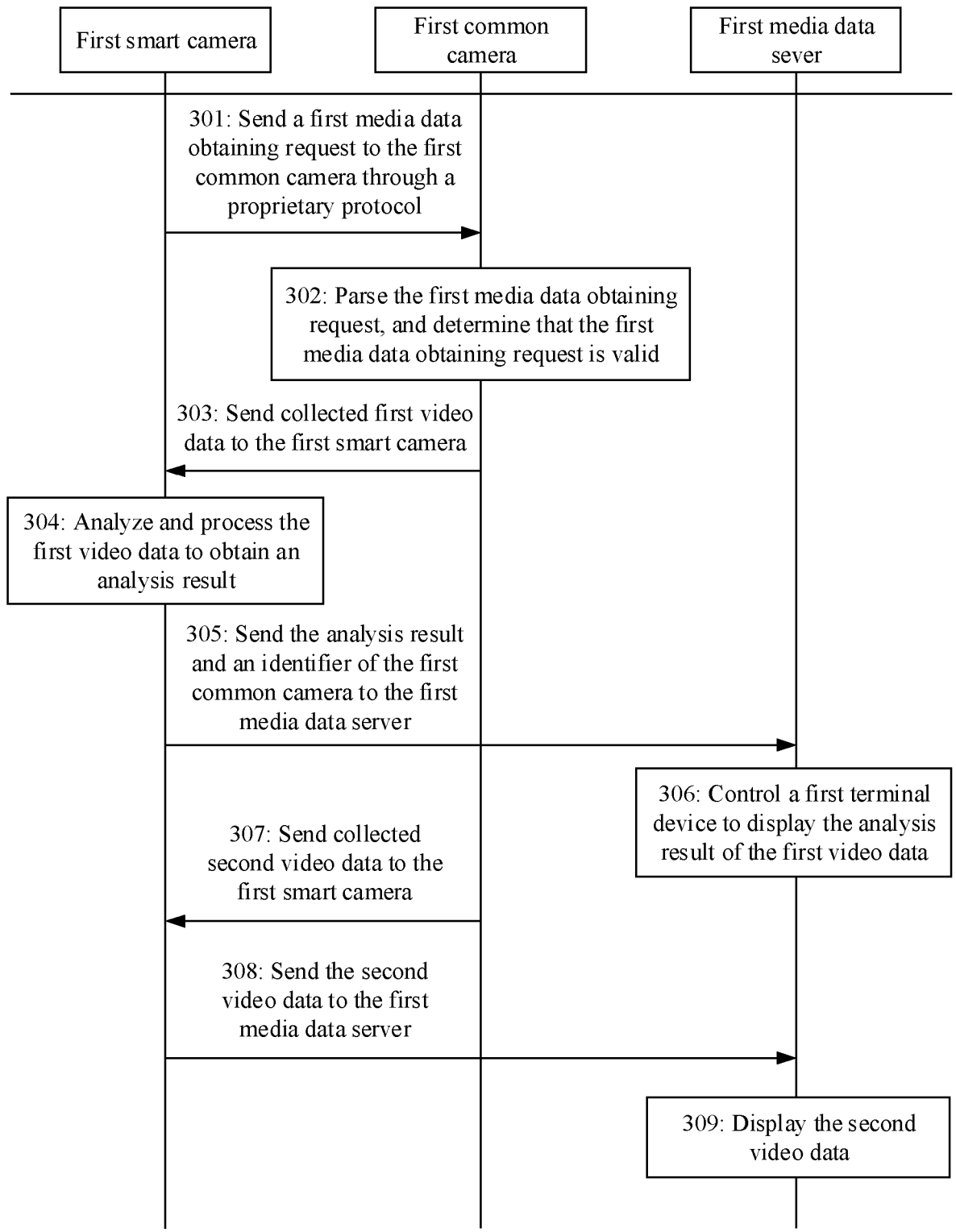
FIG. 3 is a signaling interaction diagram of an intelligent analysis method according to an embodiment of this application.

FIG. 3 is a signaling interaction diagram of an intelligent analysis method according to an embodiment of this application.

The method provided in this embodiment of this application may be implemented in the following steps 301 to 309.

Step 301: A first smart camera sends a first media data obtaining request to a first common camera through a proprietary protocol.

It should be noted that, in this embodiment of this application, a media data transmission protocol type supported by the first common camera may be pre-obtained, and the first smart camera is notified to send the first media data obtaining request to the first common camera through the media data transmission protocol type supported by the first common camera.

It should be noted that, in this embodiment of this application, the media data transmission protocol type supported by the first common camera is not limited to the proprietary protocol mentioned in the step 301, and may be an ONVIF protocol, a GB/T 28181 standard, or the like.

Step 302: The first common camera parses the first media data obtaining request, and determines that the first media data obtaining request is valid.

Step 303: The first common camera sends collected first video data to the first smart camera.

In an implementation, the first common camera may be preconfigured to send the collected first video data to the first smart camera. In other words, the step 301 and the step 302 may be omitted.

Step 304: The first smart camera analyzes the first video data to obtain an analysis result.

It should be noted that a specific implementation in which the first smart camera analyzes and processes the first video data is not specifically limited in this embodiment of this application. The first smart camera analyzes and processes the first video data, for example, may perform a decoding operation and a packet assembly operation on the first video data, or may perform a face video or a feature extraction.

Step 305: The first smart camera sends the analysis result and an identifier of the first common camera to a first media data server.

It should be noted that in this embodiment of this application, the first smart camera may further generate a task execution instruction based on the analysis result, to instruct the first common camera to execute a target task.

Step 306: The first media data server controls a first terminal device to display the analysis result of the first video data.

It should be noted that the first media data server sends the analysis result of the first video data to the first terminal device, and the first terminal device displays the analysis result of the first video data. In addition, the first media data server may further analyze and process the first video data based on the first smart camera, or perform another operation, for example, forward the first video data to another device. This is not specifically limited in this embodiment of this application.

Step 307: The first common camera sends collected second video data to the first smart camera.

It should be noted that, when the first common camera sends the collected second video data to the first smart camera, the second video data may carry an address of the first media data server, and the first smart camera forwards the second video data to the first media data server based on the address of the first media data server.

Step 308: The first smart camera sends the second video data to the first media data server.

It should be noted that because the first common camera is directly connected to the first smart camera with a network cable, the first common camera cannot directly send the second video data to the first media data server, and the second video data collected by the first common camera needs to be forwarded by the first smart camera.

It should be noted that the first smart camera may forward the second video data collected by the first common camera, and send the first video data collected by the first common camera to the first media data server.

Step 309: The first media data server controls the first terminal device to display the second video data.

It should be noted that, in addition to controlling the first terminal device to display the second video data, the first media data server may further perform another operation on the second video data, for example, forward the second video data to another device. This is not specifically limited in this embodiment of this application.

It may be understood that, in addition to processing the first video data from the first common camera, the first smart camera may also collect video data and analyze and process the video data. It can be learned that the intelligent analysis system provided in this embodiment of this application meets a requirement for performing analysis processing on the first video data of the first common camera, and fully uses a resource for performing analysis processing on the first video data by the first smart camera.

Figure 4:
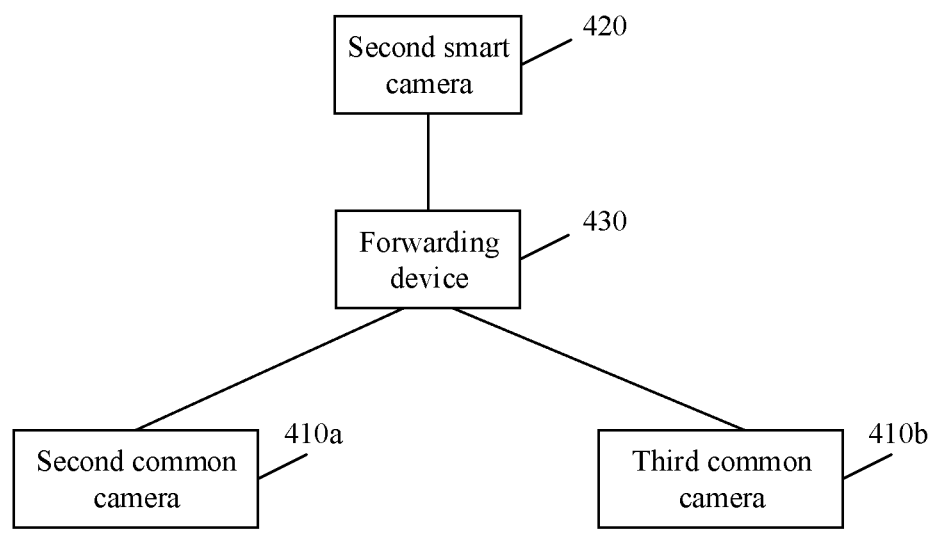
FIG. 4 is a schematic diagram of another example application scenario according to an embodiment of this application.

FIG. 4 is a schematic diagram of another example application scenario according to an embodiment of this application.

In this scenario, a media data collection device is a second common camera 410a and a third common camera 410b, and a front-end intelligent analysis device is a second smart camera 420. The second common camera 410a has a facial recognition function, but does not have a vehicle model recognition function. The third common camera 410b has only a video data collection function. In this scenario, vehicle model recognition needs to be performed on vehicles in some video data collected by the second common camera 410a and the third common camera 410b. The second smart camera 420 has the vehicle model recognition function.

In this scenario, one second common camera 410a, one third common camera 410b, one second smart camera 420, and one forwarding device 430 form a front-end intelligent analysis system. The second common camera 410a is connected to the second smart camera 420 through the forwarding device 430, and the third common camera 410b is connected to the second smart camera 420 through the forwarding device 430. The forwarding device 430 may also be connected to a media data server (not shown in FIG. 4). In this case, the forwarding device 430 is an access gateway device on a media data collection device side in a monitoring system.

It should be noted that, in this embodiment of this application, a function of the second smart camera 420 may be pre-obtained, and with reference to the function of the second smart camera 420 and an operation that needs to be performed on video data collected by the second common camera 410a and the third common camera 410b, it is determined whether to establish a connection relationship among the second common camera 410a, the third common camera 410b, and the second smart camera 420.

Figure 5:
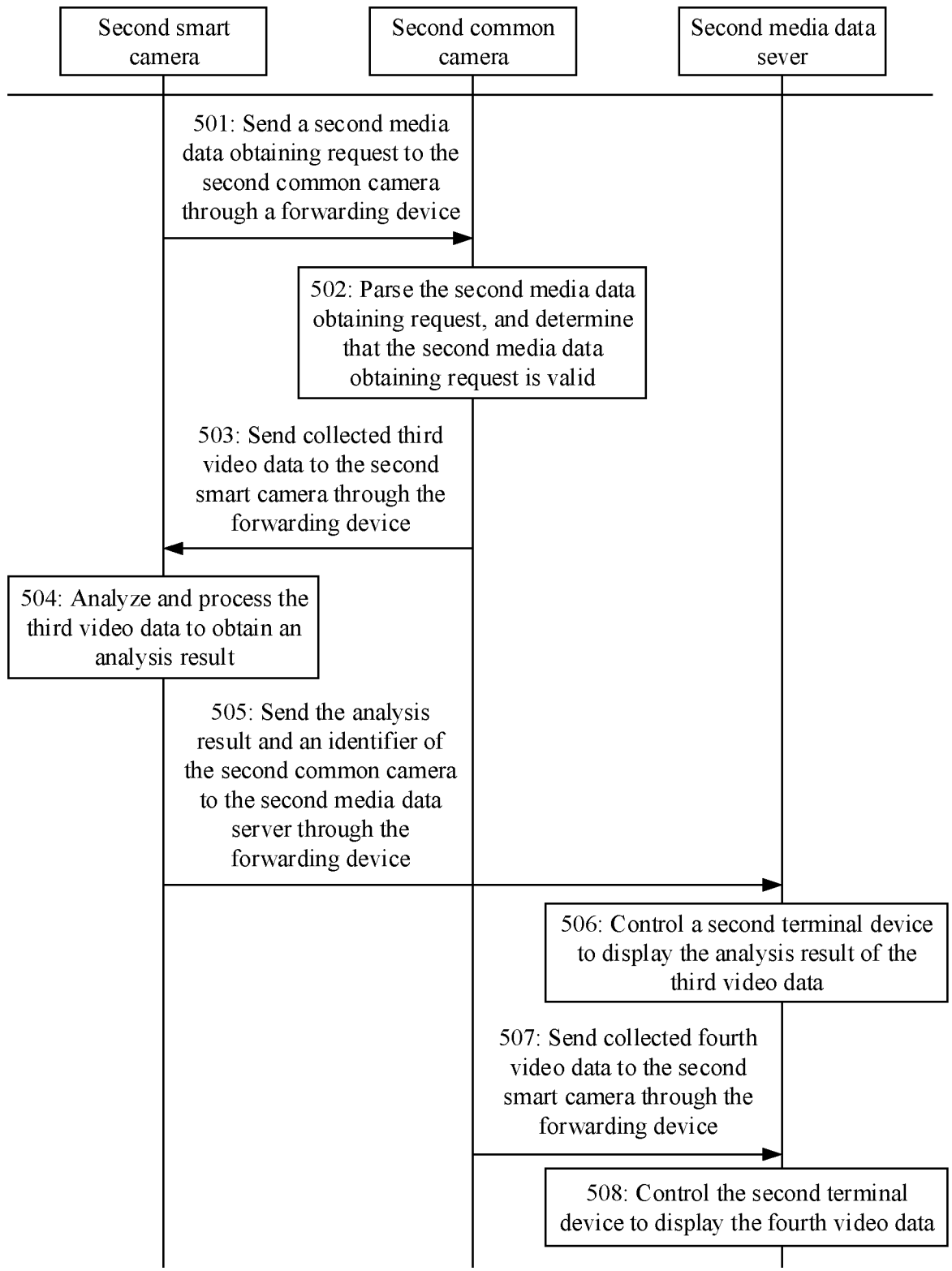
FIG. 5 is a signaling interaction diagram of an intelligent analysis method according to an embodiment of this application.

FIG. 5 is a signaling interaction diagram of an intelligent analysis method according to an embodiment of this application.

The method provided in this embodiment of this application may be implemented in the following steps 501 to 508.

Step 501: A second smart camera sends a second media data obtaining request to a second common camera through a forwarding device.

Step 502: The second common camera parses the second media data obtaining request, and determines that the second media data obtaining request is valid.

Step 503: The second common camera sends collected third video data to the second smart camera through the forwarding device.

In this embodiment of this application, because the second common camera has a facial recognition function, in this embodiment of this application, the second common camera may send collected original data, in other words, the third video data, to the second smart camera through the forwarding device, or may send third video data obtained after facial recognition analysis processing to the second smart camera. This is not specifically limited in this embodiment of this application.

It should be noted that, when the second common camera sends the third video data to the second smart camera, the third video data may carry an address of the second smart camera, and the forwarding device sends the third video data to the second smart camera based on the address of the second smart camera.

Step 504: The second smart camera analyzes the third video data to obtain an analysis result.

It should be noted that in this embodiment of this application, the second smart camera may further generate a task execution instruction based on the analysis result, to instruct the second common camera to execute a target task.

Step 505: The second smart camera sends the analysis result and an identifier of the second common camera to a second media data server through the forwarding device.

It may be understood that, when the second smart camera sends the analysis result to the second media data server, the analysis result may carry an address of the second server, and the forwarding device sends the analysis result to the second media data server based on the address of the second server.

Step 506: The second media data server controls a second terminal device to display the analysis result of the third video data.

Step 507: The second common camera sends collected fourth video data to the second smart camera through the forwarding device.

It should be noted that, when the second common camera sends the collected fourth video data to the second media data server, the fourth video data may carry an address of the second media data server, and the forwarding device forwards the fourth video data to the second media data server based on the address of the second media data server.

Step 508: The second media data server controls the second terminal device to display the fourth video data.

It should be noted that a processing procedure of the video data collected by the third common camera is similar to a processing procedure of the video data collected by the second common camera. Details are not described herein again.

It should be noted that although the second common camera and the third common camera mentioned herein have different functions, this is merely an example for description, and does not constitute a limitation on this embodiment of this application. In actual application, functions of the second common camera and the third common camera may also be the same. For example, the second common camera and the third common camera have only a video data collection function.

It should be noted that, although FIG. 4 merely shows that the second smart camera is connected to two common cameras through the forwarding device, in actual application, the second smart camera may be connected to a plurality of common cameras.

It can be learned that, through the intelligent analysis system in this embodiment of this application, the function of the second common camera can be expanded without replacing the second common camera. This reduces device replacement costs of replacing the second common camera with the second smart camera.

Based on the intelligent analysis system provided in the foregoing embodiment, an embodiment of this application further provides an intelligent analysis method.

The following describes the intelligent analysis method with reference to the accompanying drawings.

Figure 6:
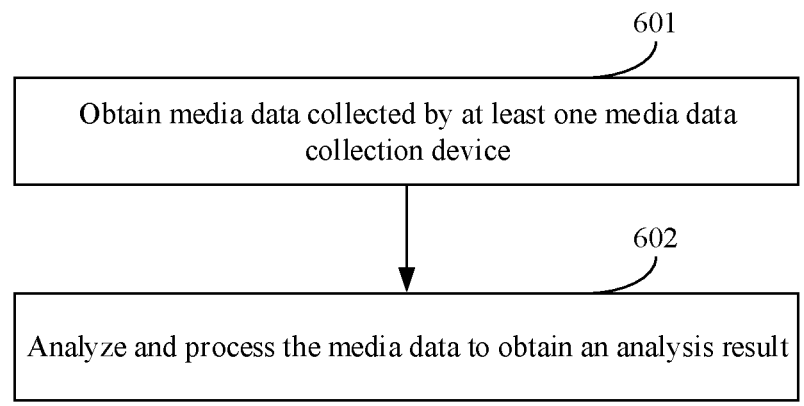
FIG. 6 is a schematic flowchart of an intelligent analysis method according to an embodiment of this application.

FIG. 6 is a schematic flowchart of an intelligent analysis method according to an embodiment of this application.

The intelligent analysis method may be applied to the front-end intelligent analysis device mentioned above.

For example, the method may be implemented in the following steps 601 to 602.

Step 601: Obtain media data collected by at least one media data collection device.

Step 602: Analyze and process the media data to obtain an analysis result.

It should be noted that, in this embodiment of this application, the at least one media data collection device and a front-end intelligent analysis are located at a front end of a monitoring system.

In a possible implementation, the method further includes: sending the analysis result to a media data server.

In a possible implementation, the method further includes:

sending a corresponding task execution instruction to the at least one media data collection device based on the analysis result, where the task execution instruction is used to instruct the at least one media data collection device to execute a target task.

In a possible implementation, the obtaining media data of at least one media data collection device includes:

sending a media data obtaining request to the at least one media data collection device, and receiving the media data sent by the at least one media data collection device based on the media data obtaining request.

In a possible implementation, the method further includes:

generating the media data obtaining request according to a media data transmission protocol corresponding to the at least one media data collection device.

In a possible implementation, the obtaining media data collected by at least one media data collection device includes:

obtaining, through a forwarding device, the media data collected by the at least one media data collection device. In a possible implementation, the method further includes:

forwarding the media data to the media data server.

In a possible implementation, the at least one media data collection device is a common camera, and the front-end intelligent analysis device is a smart camera.

It should be noted that the intelligent analysis method is a method corresponding to the intelligent analysis system described in the foregoing embodiment. Therefore, for descriptions of the steps of the intelligent analysis method, refer to the description part of the foregoing intelligent analysis system. Details are not described herein again.

It can be learned that, through the intelligent analysis method provided in this embodiment of this application, even if the media data collection device does not have a function of analyzing and processing the media data, the media data collection device may send the media data to the front-end intelligent analysis device, and after receiving the media data, the front-end intelligent analysis device analyzes and processes the media data to obtain the analysis result.

The following describes a function of a media data processing device with reference to a structure of the media data processing device.

Figure 7:
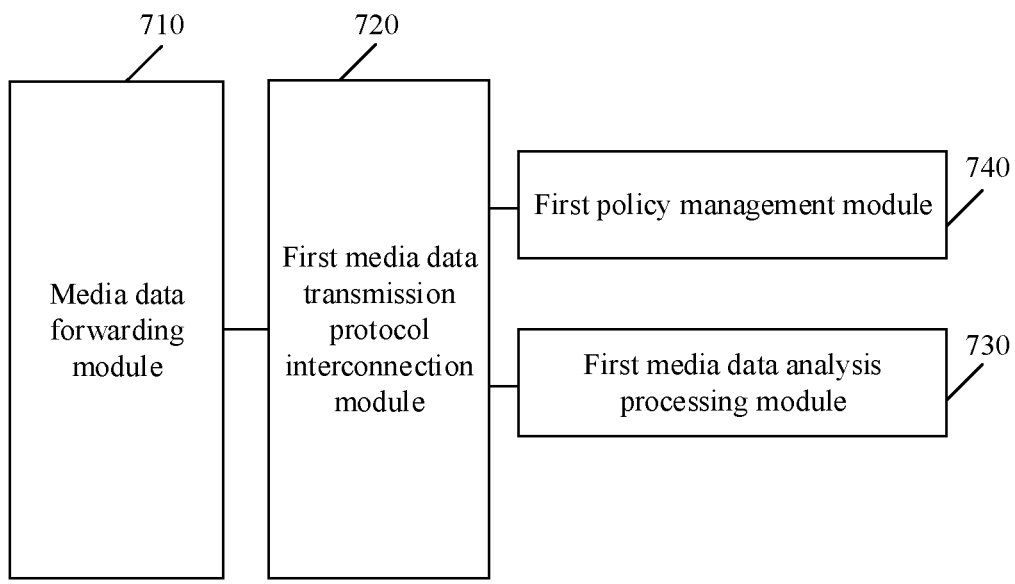
FIG. 7 is a schematic structural diagram of an intelligent analysis device according to an embodiment of this application.

FIG. 7 is a schematic structural diagram of an intelligent analysis device according to an embodiment of this application.

The intelligent analysis device shown in the figure includes a media data forwarding module 710, a first media data transmission protocol interconnection module 720, a first media data analysis processing module 730, and a first policy management module 740.

It can be learned from the foregoing description of the front-end intelligent analysis system that, on one hand, the front-end intelligent analysis device may analyze and process media data, and on the other hand, the front-end intelligent analysis device may forward the media data to a media data server. Specifically, the media data forwarding module 710 may transfer the media data to the first media data transmission protocol interconnection module 720, and forward the media data to the media data server.

It can be learned from the foregoing description of the front-end intelligent analysis system that the front-end intelligent analysis device may send a media data obtaining request to at least one media data collection device, and the at least one media data collection device may support a specific media data transmission protocol. Therefore, the front-end intelligent analysis device may generate the media data obtaining request according to a media data transmission protocol corresponding to the at least one media data collection device. Specifically, the first media data transmission protocol interconnection module 720 may generate the media data obtaining request according to the media data transmission protocol corresponding to the at least one media data collection device, and send the media data obtaining request to the at least one media data collection device through the media data forwarding module 710.

It should be noted that, after the media data forwarding module 710 transfers the media data to the first media data transmission protocol interconnection module 720, the first media data transmission protocol interconnection module 720 may check the media data to determine whether a media data format of the media data is valid, and after determining that the media data format of the media data is valid, the first media data transmission protocol interconnection module 720 transfers the media data to the first media data analysis processing module 730. The first media data analysis processing module 730 may analyze and process the media data. Specifically, the first media data analysis processing module 730 may perform analysis and processing such as packet assembly and selecting a corresponding decoding mode to decode the media data based on the media data format of the media data.

It should be noted that the first policy management module 740 is configured to determine a front-end intelligent analysis policy. For example, an interaction manner between a first media data collection device and the front-end intelligent analysis device may be determined, and a specific type of analysis processing performed by the first media data analysis processing module 730 on the media data may be determined. The interaction manner between the at least one media data collection device and the front-end intelligent analysis device may include, for example, a media data transmission protocol used for interaction between the at least one media data collection device and the front-end intelligent analysis device, and a format of media data sent by the at least one media data collection device.

It should be noted that the front-end intelligent analysis policy determined by the first policy management module 740 may be delivered by another device to the first policy management module 740. For example, an administrator may set the front-end intelligent analysis policy on a terminal device, and the terminal device delivers the front-end intelligent analysis policy to the first policy management module 740. For another example, the administrator may set the front-end intelligent analysis policy on the terminal device, the terminal device sends the front-end intelligent analysis policy to the media data server, and the media data server delivers the front-end intelligent analysis policy to the first policy management module 740.

It can be learned from the foregoing description of the intelligent analysis system that, in a possible implementation, the processing system may include a forwarding device, and the forwarding device may be further connected to the media data server. In this case, the at least one media data collection device may directly send the media data to the media data server through the forwarding device, without sending the media data to the front-end intelligent analysis device or forwarding the media data to the media data server by the front-end intelligent analysis device. In view of this, in a possible implementation of this embodiment of this application, the front-end intelligent analysis device may also include a second media data transmission protocol interconnection module 820, a second media data analysis processing module 830, and a second policy management module 840 (as shown in FIG. 8).

Figure 8:
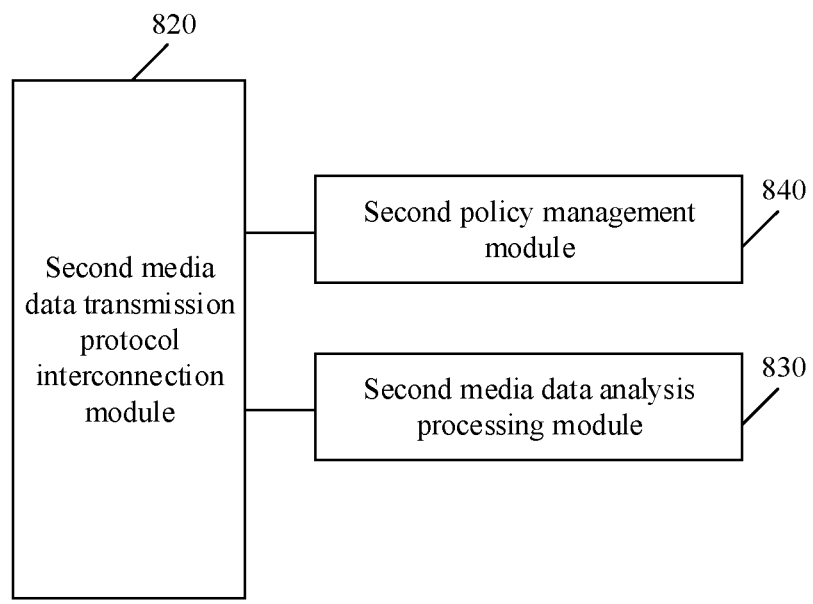
FIG. 8 is a schematic structural diagram of another intelligent analysis device according to an embodiment of this application.

For the front-end intelligent analysis device shown in FIG. 8, media data sent by at least one media data collection device is directly sent to the second media data transmission protocol interconnection module 820. The second media data transmission protocol interconnection module 820 may generate a media data obtaining request according to a media data transmission protocol corresponding to the at least one media data collection device, and directly send the media data obtaining request to the at least one media data collection device.

For other descriptions of the second media data transmission protocol interconnection module 820, refer to the description part of the first media data transmission protocol interconnection module 720. Details are not described herein again.

Because a function of the second media data analysis processing module 830 is similar to a function of the first media data analysis processing module 730, for the second media data analysis processing module 830, refer to the foregoing description part of the first media data analysis processing module 730. Details are not described herein again. Correspondingly, a function of the second policy management module 840 is similar to a function of the first policy management module 740. Therefore, for the second policy management module 840, refer to the foregoing description part of the first policy management module 740. Details are not described herein again.

It should be noted that FIG. 7 and FIG. 8 are merely schematic descriptions of the front-end intelligent analysis device, and do not constitute a limitation on the front-end intelligent analysis device. The front-end intelligent analysis device in this embodiment of this application may alternatively have another structure.

Based on the intelligent analysis system and method provided in the foregoing embodiment, an embodiment of this application further provides an intelligent analysis device.

The following describes the intelligent analysis device with reference to the accompanying drawings.

Figure 9:
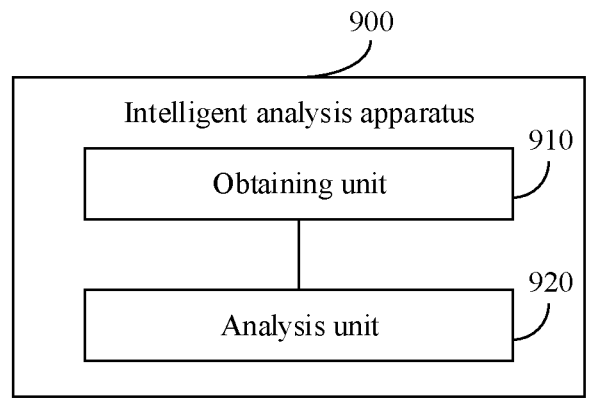
FIG. 9 is a schematic structural diagram of an intelligent analysis device according to an embodiment of this application.

FIG. 9 is a schematic structural diagram of an intelligent analysis device according to an embodiment of this application.

An intelligent analysis device 900 provided in an embodiment of this application includes an obtaining unit 910 and an analysis unit 920.

The obtaining unit 910 is configured to obtain media data collected by at least one media data collection device.

The analysis unit 920 is configured to analyze the media data to obtain an analysis result.

It should be noted that, in this embodiment of this application, the intelligent analysis device is configured to be deployed at a front end of a monitoring system.

In a possible implementation, the intelligent analysis device 900 further includes:

a first sending unit, configured to send the analysis result to a media data server.

In a possible implementation, the intelligent analysis device 900 further includes: a second sending unit, configured to send a corresponding task execution instruction to the at least one media data collection device based on the analysis result, where the task execution instruction is used to instruct the at least one media data collection device to execute a target task.

In a possible implementation, the obtaining unit 910 is specifically configured to:

send a media data obtaining request to the at least one media data collection device, and receive the media data sent by the at least one media data collection device based on the media data obtaining request.

In a possible implementation, the intelligent analysis device 900 further includes:

a request generation unit, configured to generate the media data obtaining request according to a media data transmission protocol corresponding to the at least one media data collection device.

In a possible implementation, the obtaining unit 910 is specifically configured to:

obtain, through a forwarding device, the media data collected by the at least one media data collection device.

In a possible implementation, the front-end intelligent analysis device 900 further includes:

a forwarding unit, configured to forward the media data to the media data server.

In a possible implementation, the at least one media data collection device is a common camera, and the intelligent analysis device is a smart camera.

It should be noted that, because the media data processing device is an device corresponding to the media data processing method described in the foregoing embodiment, for specific implementation of each unit of the media data processing device, refer to the description part of the foregoing media data processing method (or system). Details are not described herein again.

It can be learned that, through the intelligent analysis device provided in this embodiment of this application, even if the media data collection device does not have a function of analyzing and processing the media data, the media data collection device may send the media data to the front-end intelligent analysis device, and after receiving the media data, the front-end intelligent analysis device analyzes and processes the media data to obtain the analysis result.

Figure 10:
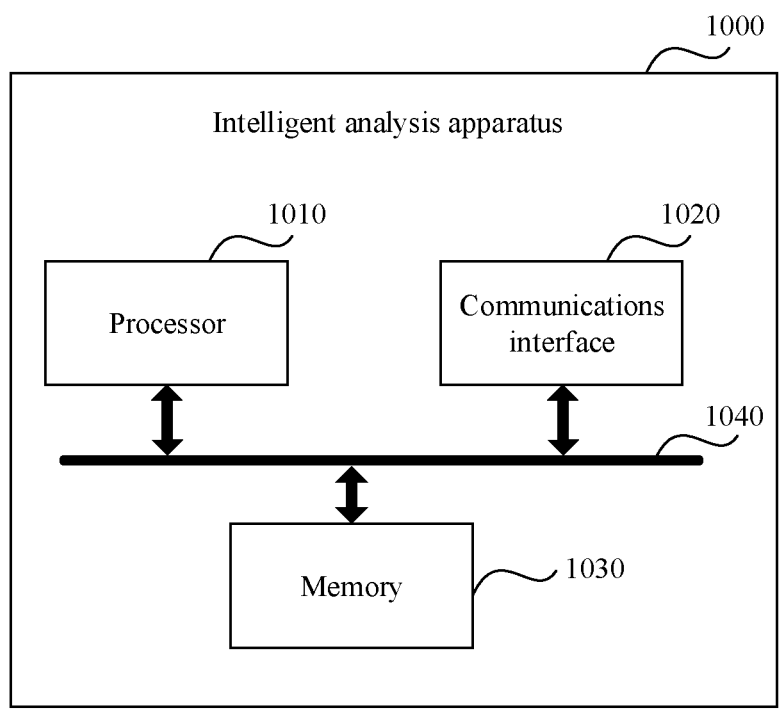
FIG. 10 is a schematic structural diagram of an intelligent analysis device according to an embodiment of this application.

The following describes an intelligent analysis device in an embodiment of this application. Referring to FIG. 10, the intelligent analysis device 1000 includes a processor 1010, a communications interface 1020, and a memory 1030. There may be one or more processors 1010 in the intelligent analysis device 1000. One processor is used as an example in FIG. 10. In this embodiment of this application, the processor 1010, the communications interface 1020, and the memory 1030 may be connected through a bus system or in another manner. In FIG. 10, an example in which the processor 1010, the communications interface 1020, and the memory 1030 are connected through the bus system 1040 is used.

The processor 1010 may be a central processing unit (central processing unit, CPU), a network processor (network processor, NP), or a combination of the CPU and the NP. The processor 1010 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

The memory 1030 may include a volatile memory (English: volatile memory), for example, a random-access memory (random-access memory, RAM). The memory 1030 may alternatively include a non-volatile memory (English: non-volatile memory), for example, a flash memory (English: flash memory), a hard disk drive (hard disk drive, HDD), or a solid-state drive (solid-state drive, SSD). The memory 1030 may further include a combination of the foregoing types of memories.

The memory 1030 may be configured to store information such as media data sent by at least one media data collection device and a media data transmission protocol corresponding to the at least one media data collection device.

Optionally, the memory 1030 stores an operating system and a program, an executable module, or a media data structure, or a subset thereof, or an expansion set thereof. The program may include various operation instructions, used to implement various operations. The operating system may include various system programs, to implement various basic services and process hardware-based tasks. The processor 1010 may read a program in the memory 1030, to implement the intelligent analysis method provided in this embodiment of this application.

The bus system 1040 may be a peripheral component interconnect (peripheral component interconnect, PCI) bus, an extended industry standard architecture (extended industry standard architecture, EISA) bus, or the like. The bus system 1040 may be classified into an address bus, a data bus, a control bus, and the like. For ease of representation, only one thick line is used to represent the bus in FIG. 10, but this does not mean that there is only one bus or only one type of bus.

An embodiment of this application further provides a computer-readable storage medium, including an instruction. When the instruction is run on a computer, the computer is enabled to perform the intelligent analysis method provided in the foregoing embodiment.

An embodiment of this application further provides a computer program product including an instruction. When the computer program product runs on a computer, the computer is enabled to perform the intelligent analysis method in the foregoing embodiment.

It may be clearly understood by a person skilled in the art that, for the purpose of convenient and brief description, for a detailed working process of the foregoing system, device, and unit, refer to a corresponding process in the foregoing method embodiments. Details are not described herein again.

In a plurality of the embodiments provided in this application, it should be understood that the disclosed system, device, and method may be implemented in other manners.

For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A monitoring system comprising a media data collection device, a front-end intelligent analysis device separate from the media data collection device, and a media data server, wherein the front-end intelligent analysis device is a smart camera with a first intelligent analysis capability, and the media data collection device is a non-smart camera without the first intelligent analysis capability, wherein:

the media data collection device is configured to collect first media data and send the first media data to the front-end intelligent analysis device;

the front-end intelligent analysis device is configured to receive the first media data, and perform the first intelligent analysis on the first media data to obtain a first analysis result;

the media data collection device is further configured to collect second media data and send the second media data to the media data server;

the media data server is configured to perform second intelligent analysis on the second media data, wherein the second media data is data on which the first intelligent analysis is not performed by the front-end intelligent analysis device; wherein the first media data and the second media data are visual data; and the front-end intelligent analysis device is further configured to:

collect third media data; and analyze the third media data to obtain a second analysis result.

2. The system according to claim 1, wherein the front-end intelligent analysis device is further configured to send a corresponding task execution instruction to the media data collection device based on the first analysis result, and the task execution instruction instructs the media data collection device to execute a target task.

3. The system according to claim 1, wherein the front-end intelligent analysis device is further configured to forward the first media data to the media data server.

4. The system according to claim 1, wherein the system further comprises a forwarding device, and the media data collection device is connected to the front-end intelligent analysis device through the forwarding device; and the media data collection device is configured to send the first media data to the front-end intelligent analysis device through the forwarding device.

5. The system according to claim 1, wherein the front-end intelligent analysis device is further configured to send a media data obtaining request to the media data collection device; and the media data collection device is configured to send the first media data to the front-end intelligent analysis device based on the media data obtaining request.

6. The system according to claim 5, wherein the front-end intelligent analysis device is further configured to generate the media data obtaining request according to a media data transmission protocol corresponding to the media data collection device.

7. The system according to claim 1, wherein:

the media data collection device is configured to collect a video data;

wherein the first intelligent analysis comprises facial recognition.

8. The system according to claim 1, wherein:

the front-end intelligent analysis device is configured to send a media data request to the media data collection device;

the media data collection device is configured to collect the first media data in response to receiving the request, wherein the first media data is video data.

9. An intelligent analysis method, performed by a monitoring system comprising a media data collection device, a front-end intelligent analysis device separate from the media data collection device, and a media data server, wherein the front-end intelligent analysis device is a smart camera with a first intelligent analysis capability, and the media data collection device is a non-smart camera without the first intelligent analysis capability; and wherein the method comprises:

sending, by the media data collection device, first media data collected by the media data collection device to the front-end intelligent analysis device;

performing, by the front-end intelligent analysis device, the first intelligent analysis on the first media data to obtain a first analysis result;

sending, by the media data collection device, second media data collected by the media data collection device to the media data server;

performing, by the media data server, second intelligent analysis on the second media data, wherein the second media data is data on which the first intelligent analysis is not performed by the front-end intelligent analysis device; wherein the first media data and the second media data are visual data;

collecting, by the front-end intelligent analysis device, third media data; and analyzing, by the front-end intelligent analysis device, the third media data to obtain a second analysis result.

10. The method according to claim 9, wherein the method further comprises:

sending, by the front-end intelligent analysis device, the first analysis result to the media data server.

11. The method according to claim 9, wherein the method further comprises:

sending, by the front-end intelligent analysis device, a corresponding task execution instruction to the media data collection device based on the first analysis result, wherein the task execution instruction instructs the media data collection device to execute a target task.

12. The method according to claim 9, further comprising receiving media data collected by the media data collection device, wherein the receiving media data collected by the media data collection device comprises:

sending, by the front-end intelligent analysis device, a media data request to the media data collection device, and receiving, by the front-end intelligent analysis device, the first media data sent by the media data collection device based on the media data request.

13. The method according to claim 12, wherein the method further comprises:

generating, by the front-end intelligent analysis device, the media data request according to a media data transmission protocol corresponding to the media data collection device.

14. The method according to claim 9, further comprising receiving media data collected by the media data collection device, wherein the receiving media data collected by media data collection device comprises:

receiving, by the front-end intelligent analysis device, through a forwarding device, the first media data collected by the media data collection device.

15. The method according to claim 9, wherein the method further comprises:

forwarding, by the front-end intelligent analysis device, the first media data to the media data server.

16. The method according to claim 9, wherein the first intelligent analysis comprises facial recognition based on the first media data received from the media data collection device.

17. The system according to claim 1, wherein the media data collection device and the front-end intelligent analysis device are located at a front end of the monitoring system and the media data server is located at a back end of the monitoring system.

* * * * *